(12) United States Patent
So

(10) Patent No.: US 6,474,269 B2
(45) Date of Patent: Nov. 5, 2002

(54) ANIMAL TRAINING APPARATUS HAVING A RECEIVING ANTENNA AND METHOD OF CONTROLLING THE APPARATUS

(76) Inventor: Ho-Yun So, 8-1006, Kwangjang Apt., 28, Youido-dong, Yongdungpo-gu, Seoul, 150-010 (KR)

(*) Notice: Subject to any disclaimer, the term of this patent is extended or adjusted under 35 U.S.C. 154(b) by 0 days.

(21) Appl. No.: 09/955,460

(22) Filed: Sep. 18, 2001

(65) Prior Publication Data

US 2002/0040689 A1 Apr. 11, 2002

(30) Foreign Application Priority Data

Sep. 19, 2000 (KR) .............................................. 00-54978
Jun. 28, 2001 (KR) .............................................. 01-37707

(51) Int. Cl.[7] .......................... A01K 15/02; A01K 15/04
(52) U.S. Cl. ....................................... 119/720; 119/719
(58) Field of Search ................................ 119/718, 719, 119/720, 721

(56) References Cited

U.S. PATENT DOCUMENTS

| | | | | |
|---|---|---|---|---|
| 5,666,908 A | | 9/1997 | So .............................. | 119/720 |
| 5,815,077 A | * | 9/1998 | Christiansen ................ | 119/718 |
| 6,073,589 A | * | 6/2000 | Curen et al. ................. | 119/718 |
| 6,135,060 A | * | 10/2000 | So .............................. | 119/719 |
| 6,167,843 B1 | * | 1/2001 | Kim ............................ | 119/720 |
| 6,170,439 B1 | * | 1/2001 | Duncan et al. ............. | 119/720 |
| 6,226,229 B1 | * | 5/2001 | Dinardo ...................... | 119/719 |

* cited by examiner

Primary Examiner—Charles T. Jordan
Assistant Examiner—Elizabeth Shaw
(74) Attorney, Agent, or Firm—Richard C. Woodbridge, Esq.; Woodbridge & Associates, PC

(57) ABSTRACT

An animal training apparatus having a receiving antenna and method of controlling the apparatus are disclosed. The transmitter of the apparatus varies or sets the intensity level of the electric shock linearly by an electric shock adjusting means, operates any one selected from the first through fourth function switches, and outputs a control signal corresponding to a selected switch from the antenna of the transmitter to a receiver worn on the neck of an animal, and the receiver receives the signal from the transmitter, outputs the electric shock to the animal while varying the electric shock linearly by the electric shock adjusting means for a predetermined period of time when the trainer operates the first function switch.

11 Claims, 7 Drawing Sheets

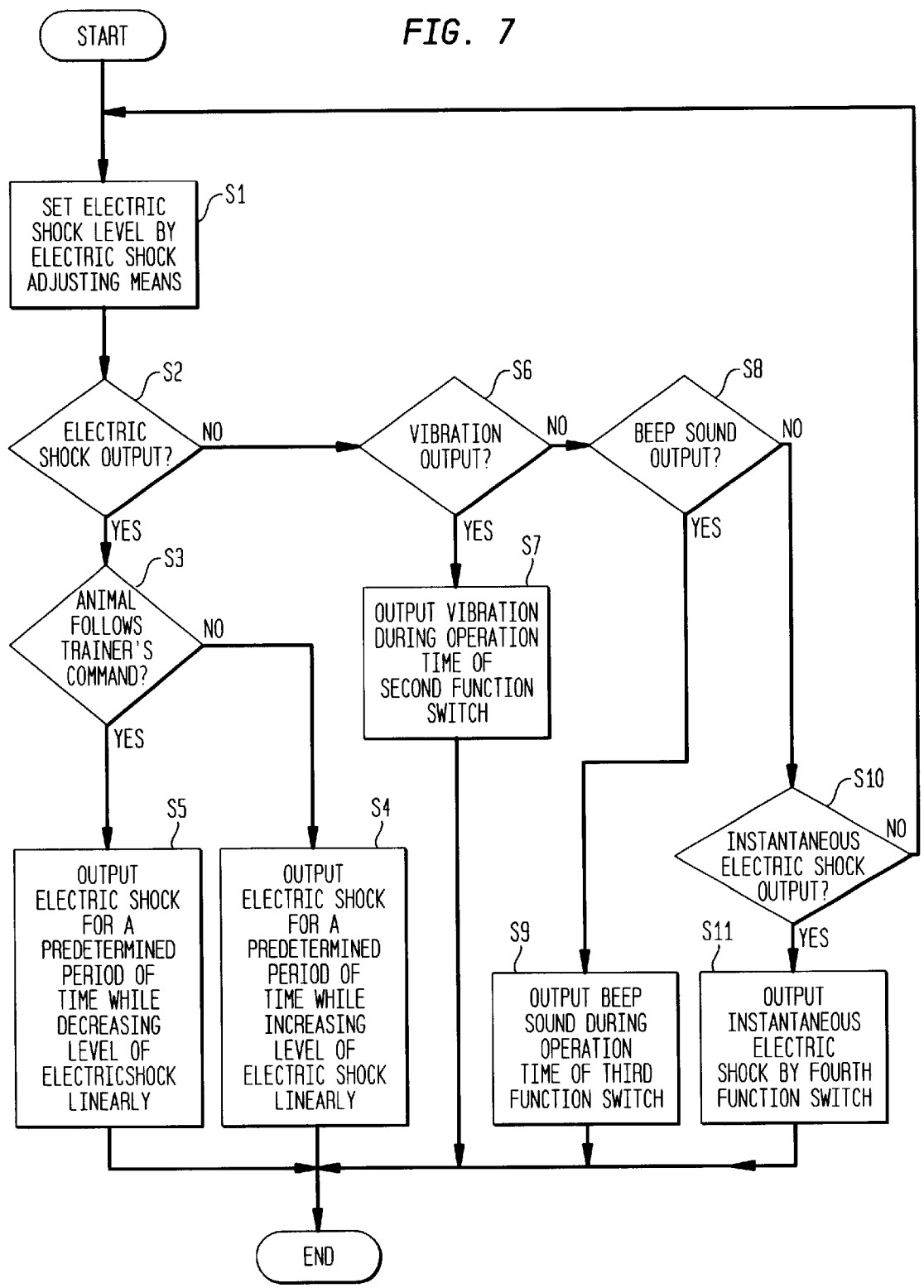

ANIMAL TRAINING APPARATUS HAVING A RECEIVING ANTENNA AND METHOD OF CONTROLLING THE APPARATUS

CROSS REFERENCE TO RELATED APPLICATIONS

This application claims the priority of Korean patent application 10-2000-54978 filed Sep. 19, 2000 and Korean patent application 10-2001-37707 filed Jun. 28, 2001.

BACKGROUND OF THE INVENTION

1. Field of the Invention

The present invention relates in general to an animal training apparatus which is worn on the neck of an animal and gives a shock by applying at least one of an electric shock, a vibration and beep sound to the animal for training it, and more particularly to an animal training apparatus having a receiving antenna within a case, which is worn on the neck of an animal, in order for the animal to move without hindrance when the animal (e.g. a hunting dog) runs to recover an object or animal such as small game or big game in training, and method of controlling the apparatus.

2. Description of the Prior Art

Generally, an animal training apparatus is worn on the neck or any part of an animal, such that it gives an electric shock to the animal for training it.

A conventional animal training apparatus is disclosed in U.S. Pat. No. 5,666,908, and-is shown in FIG. 1. Referring to FIG. 1, the animal training apparatus comprises a transmitter 110 and a receiver 100.

The transmitter 110 transmits an RF signal 112 to the receiver 100 to give an electric stimulation to the animal. For this operation, the transmitter 110 includes a stimulation adjuster controller 114, a power switch 116 and a transmitting antenna 118. The stimulation adjuster controller 114 sets the stimulation level of the electric shock outputted from the receiver 100. The power switch 116 is adapted to control the transmission of the RF signal with the level set by the stimulation adjuster controller 114. The transmission antenna 118 transmits the RF signal 112 containing level indication information of the electric shock and indication (ID) code information for determining a corresponding receiver according to the conditions set by the stimulation adjuster controller 114.

Further, the receiver 100 receives the RF signal 112 from the transmitter 110 through the transmitting antenna 118, and generates an electric shock with a level set by the stimulation adjuster controller 114 for a predetermined period of time. For this operation, the receiver 100 includes a receiving antenna 212, a receiver unit 130 and a plurality of electrodes 132. The receiving antenna 212 receives the RF signal 112 from the transmitting antenna 118 in the transmitter 110. The receiver unit 130 amplifies and detects the RF signal. The electrodes 132 are mounted to the receiver unit 130 such that they penetrate the collar 120 and project toward the neck of the animal, and so the electric shock from the receiver unit 130 is applied to the animal.

The receiver unit 130 includes a detecting means, a receiving microprocessor, an amplifying means, and an electric shock generating means. The detecting means receives the RF signal 112 through the receiving antenna 212 and demodulates the RF signal to the electric shock with the level set by the stimulation adjuster controller 114. The receiving microprocessor determines whether or not the demodulated signal from the detecting means is the same signal that a trainer transmits, and outputs an electric shock control signal with the level set by the stimulation adjuster controller 114 if they are the same. The amplifying means is switched according to the electric shock control signal from the microprocessor and amplifies the demodulated signal to a predetermined level. The electric shock generating means generates the electric shock with a high voltage according to an amplification degree by the amplifying means.

However, the conventional animal training apparatus is problematic in that the stimulation adjuster controller 114 of the transmitter 110 is made of a mechanical switch and the signal level of the electric shock from the receiver 100 is constant, and therefore, it is undesirable to train the animal unable to endure electric shock. In addition, the receiving antenna 212 is externally clamped to the collar 120, and a variety of obstacles such as grass or a bush, may be easily caught at the gap between the collar and clamp, and prevent the animal (for example, hunting dog) from quickly moving forward.

Further, the conventional animal training apparatus is disadvantageous in that when it rains or the animal goes in water, the transmitted RF signal is leaked and then, the level of the receiving RF signal is lowered, thus, decreasing the antenna characteristics, due to the exposure of the junction of the antenna and the receiver unit to the outside.

Another disadvantage experienced in the conventional training apparatus resides in that during an animal training, an electric shock with a constant level set by the stimulation adjuster controller 114 made of a mechanical switch is always applied to the animal for a predefined period of time, so that it is difficult to train animals unable to endure the electric shock with the conventional apparatus.

SUMMARY OF THE INVENTION

Therefore, the present invention has been made in view of the above problem, and it is an object of the present invention to provide an animal training apparatus having a receiving antenna, which prevents the catch of obstacles such as grass or a bush at the gap between a collar and an antenna, in order for the animal to move without hindrance when an animal (e.g. a hunting dog) is quickly moving for a target.

It is another object. of the present invention to provide an animal training apparatus having a receiving antenna, which receives a signal with high sensitivity even if it rains or the animal goes in water.

It is still another object of the present invention to provide an animal training apparatus having a receiving antenna, which is worn on any part of an animal, for applying the electric shock with high voltage to the animal only for a predetermined period of time to train the animal.

It is still another object of the present invention to provide an animal training apparatus having a receiving antenna, which has a simple construction and is low in its manufacturing cost.

It is still another object of the present invention to provide an animal training apparatus having a receiving antenna, which allows easy maintenance when the apparatus is out of order, in addition to allowing an easy use for the trainer.

It is still another object of the present invention to provide a method of controlling the animal training apparatus.

In accordance with one aspect of the. present invention, the above and other objects can be accomplished by the provision of an animal training apparatus comprising a transmitter for transmitting a command from an animal trainer and a receiver worn on the neck of an animal for receiving an RF signal from the transmitter and outputting a specific signal to the animal for a predetermined period of time if a trainer's secret number contained in the RF signal corresponds to the pre-stored secret number. The transmitter comprises an electric shock adjusting means for setting the intensity level of an electric shock applied to the animal by linearly varying the level continuously, a first function switch for controlling the electric shock with the level set by the electric shock adjusting means to be outputted for a predetermined period of time, a second function switch for controlling an output of vibration, a third function switch for controlling an output of a beep sound for calling the animal, a fourth function switch for controlling the electric shock set by the electric shock adjusting means to be outputted instantaneously for a short time, a transmitting microprocessor for processing operation signals set by the first through fourth switches, selecting one among data waveforms of an electric shock generating control signal, a vibration generating control signal, a beep sound generating control signal, and an instantaneous electric shock generating control signal as a control signal data waveform, and outputting the control signal data waveform along with a data waveform of the user's secret number, an oscillation means for oscillating an RF predetermined signal as an oscillation wave, a modulation means for modulating a carrier signal of the oscillation wave according to the control signal data waveform selected from the microprocessor and the secret number data waveform, an RF amplifying means for RF-amplifying the modulated carrier signal, a low pass filter for cutting off harmonic wave components of the amplified and modulated carrier signal, and outputting a fundamental wave thereof, and a transmitting antenna for transmitting an RF signal of the fundamental wave from the low pass filter. The receiver comprises a receiving antenna installed within a case for receiving the RF signal from the transmitting antenna of the transmitter, a coupling capacitor for cutting off a DC component of the RF signal, and outputting only an AC component RF signal, an RF module for amplifying the AC component RF signal to a predetermined level, filtering the amplified result, demodulating the filtered signal, and outputting the demodulated signal as an analog signal, a microprocessor module for converting the analog signal to a digital signal, processing the digital signal, and controlling one of the electric shock generating control signal, the vibration generating control signal, the beep sound generating control signal, and an instantaneous electric shock generating control signal, which is previously applied from any one of the first through fourth function switches to be outputted if a secret number contained in the received analog signal corresponds to a pre-stored secret number, an electric shock driving means for receiving the electric shock generating control signal or the instantaneous electric shock generating control signal from the microprocessor module, amplifying the electric shock level in response to the electric shock generating control signal to vary the electric shock level linearly by the electric shock adjusting means for a predetermined period of time set by the first function switch, or amplifying the electric shock level in response to the instantaneous electric shock generating control signal to instantaneously vary its level linearly for a short period of time set by the fourth function switch, and outputting the amplified signal as an electric shock driving signal or an instantaneous electric shock driving signal, a high voltage generating means for generating an electric shock with a high voltage having a level varied linearly by the electric shock adjusting means in response to the electric shock driving signal or the instantaneous electric shock driving signal from the electric shock driving means, a plurality of electrodes for outputting the electric shock with the high voltage generated from the high voltage generating means to the animal, a motor driving means for driving a vibration motor in response to the vibration generating control signal from the microprocessor module and applying vibration to the animal for a predetermined period of time, and a buzzer driving means for driving a buzzer to output a beep sound in response to the beep sound generating control signal from the microprocessor module, thus finding a position of the animal.

In accordance with another aspect of the present invention, there is provided a method of controlling an animal training apparatus having a receiving antenna, comprising the steps of a) setting an intensity level of an electric shock by an electric shock adjusting means, b) determining whether or not the electric shock is outputted, c) determining whether or not the animal follows a command from a trainer if the electric shock is outputted, d) outputting the electric shock from a plurality of electrodes of a high voltage-generating means during an operating time of a first function switch, while increasing the output level of the electric shock linearly by the electric shock adjusting means if the animal doesn't follow the command at step c), e) outputting the electric shock from the electrodes of the high voltage generating means during an operating time of the first function switch, while decreasing the output level of the electric shock linearly by the electric shock adjusting means if the animal follows the command at step c), f) determining whether or not vibration is outputted if the electric shock is not outputted at step c), g) outputting vibration to the animal by driving a vibration motor during an operating time of a second function switch if vibration is outputted at step f), h) determining whether or not a beep sound is outputted, if vibration is not outputted at step f), i) outputting the beep sound through a buzzer in order to find a position of the animal during an operating time of a third function switch if the beep sound is outputted at step h), j) determining whether or not an instantaneous electric shock is outputted if the beep sound is not outputted at step h), k) outputting the instantaneous electric shock from the electrodes during an operating time of a fourth switch if the instantaneous electric shock is outputted at step h) and l) returning to step a) if the instantaneous electric shock is not outputted at step j).

BRIEF DESCRIPTION OF THE DRAWINGS

The above and other objects, features and advantages of the present invention will be more clearly understood from the following detailed description taken in conjunction with the accompanying drawings, in which:

FIG. 7 is a flowchart showing a method of controlling the animal training apparatus of this invention.

DETAILED DESCRIPTION OF THE PREFERRED EMBODIMENTS

Figure 1:
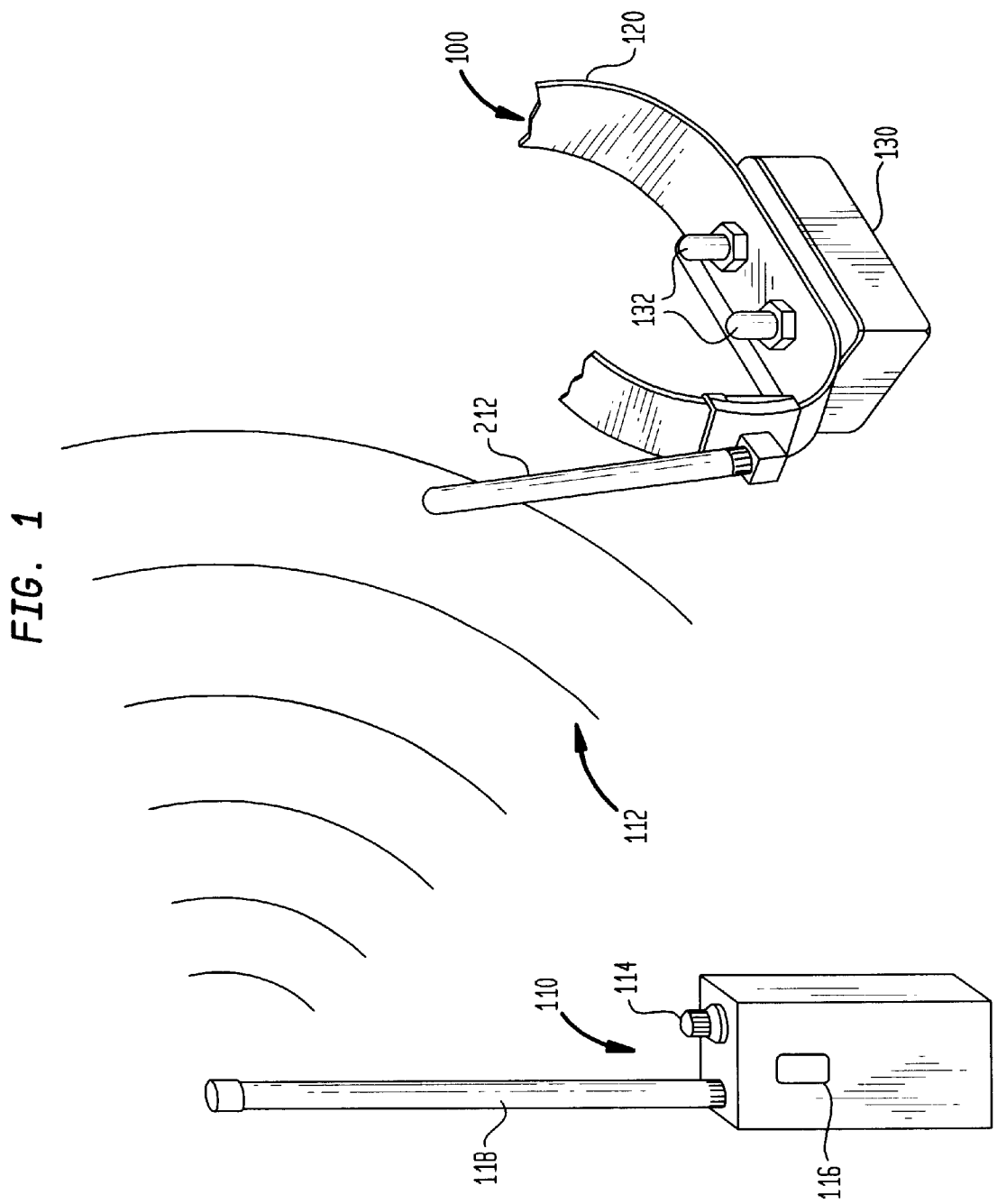
FIG. 1 is a perspective view showing an animal training apparatus according to the prior art.
Figure 2:
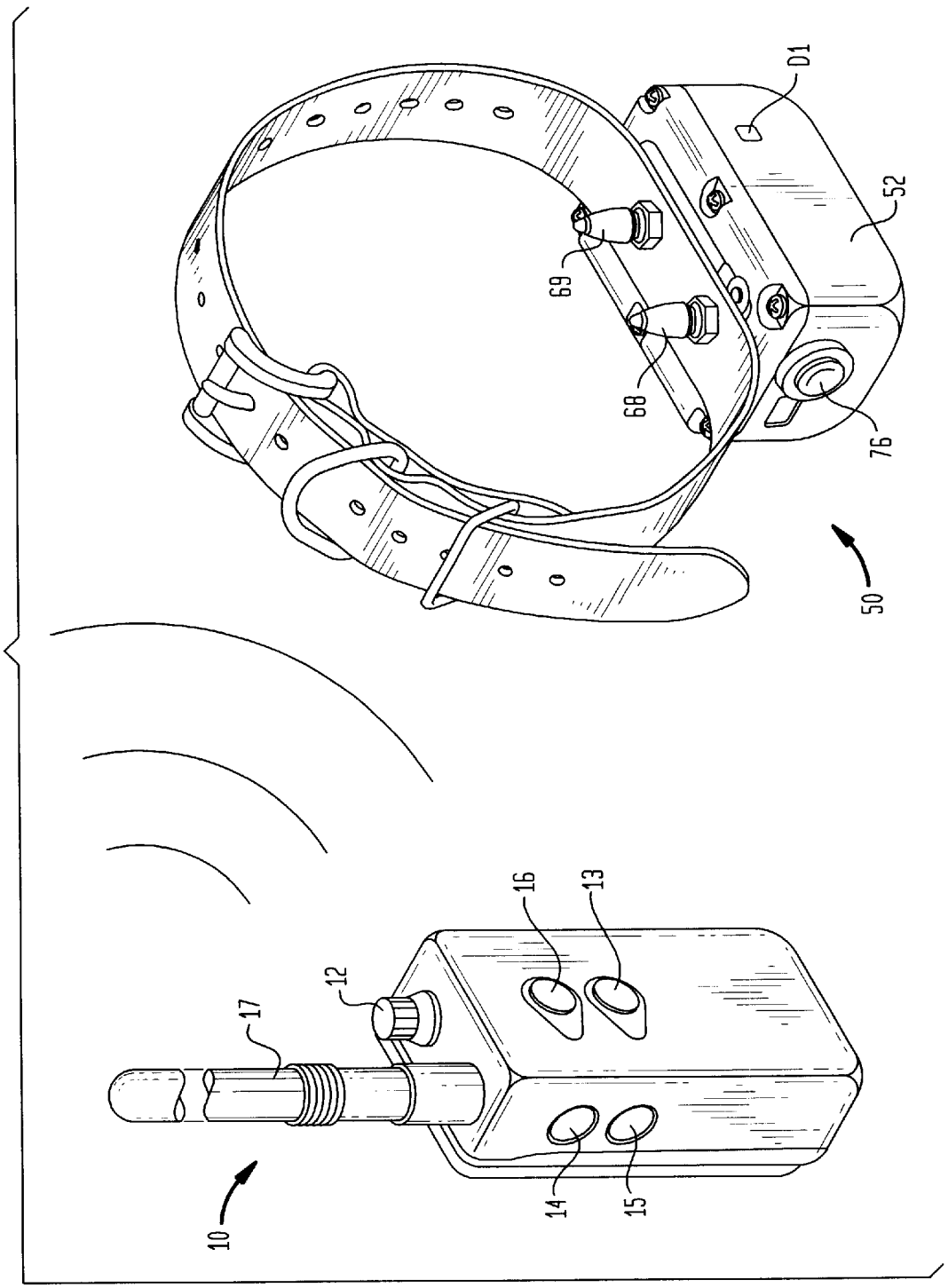
FIG. 2 is a perspective view showing a transmitter and receiver of the animal training apparatus having a receiving antenna according to the preferred embodiment of this invention.
Figure 3:
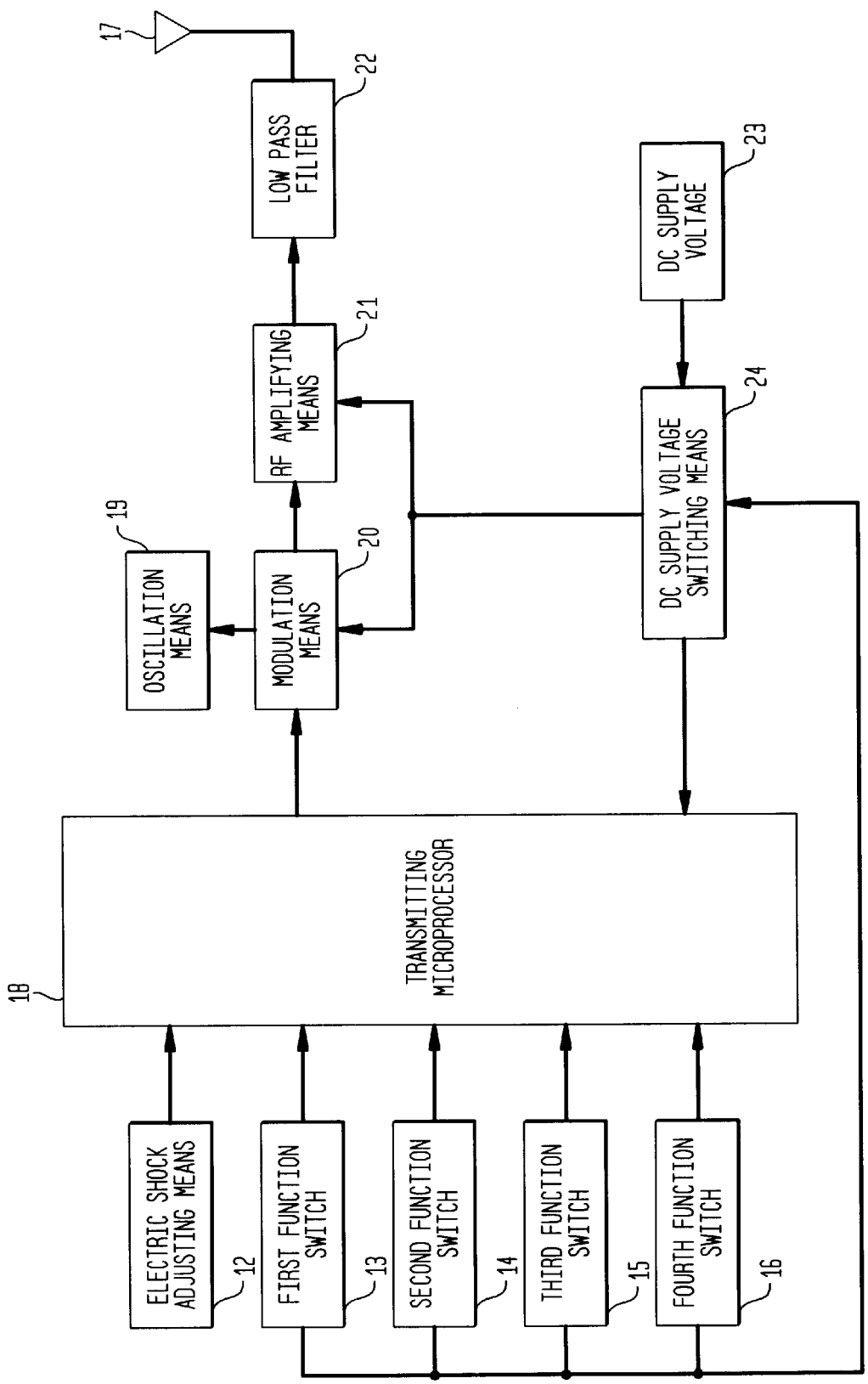
FIG. 3 is a control block diagram of the transmitter of this invention.
Figure 4:
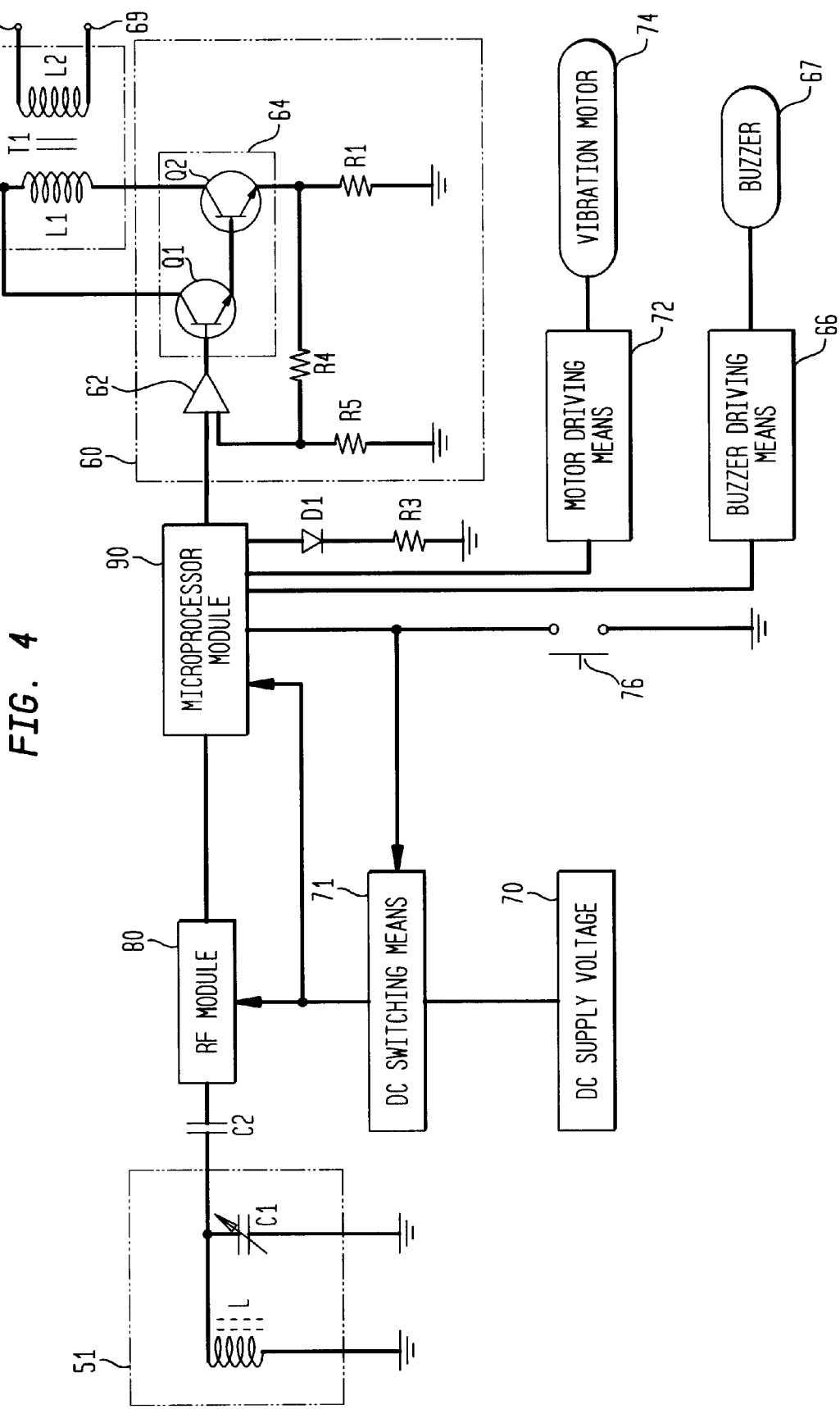
FIG. 4 is a control block diagram of the receiver of this invention.
Figure 5:
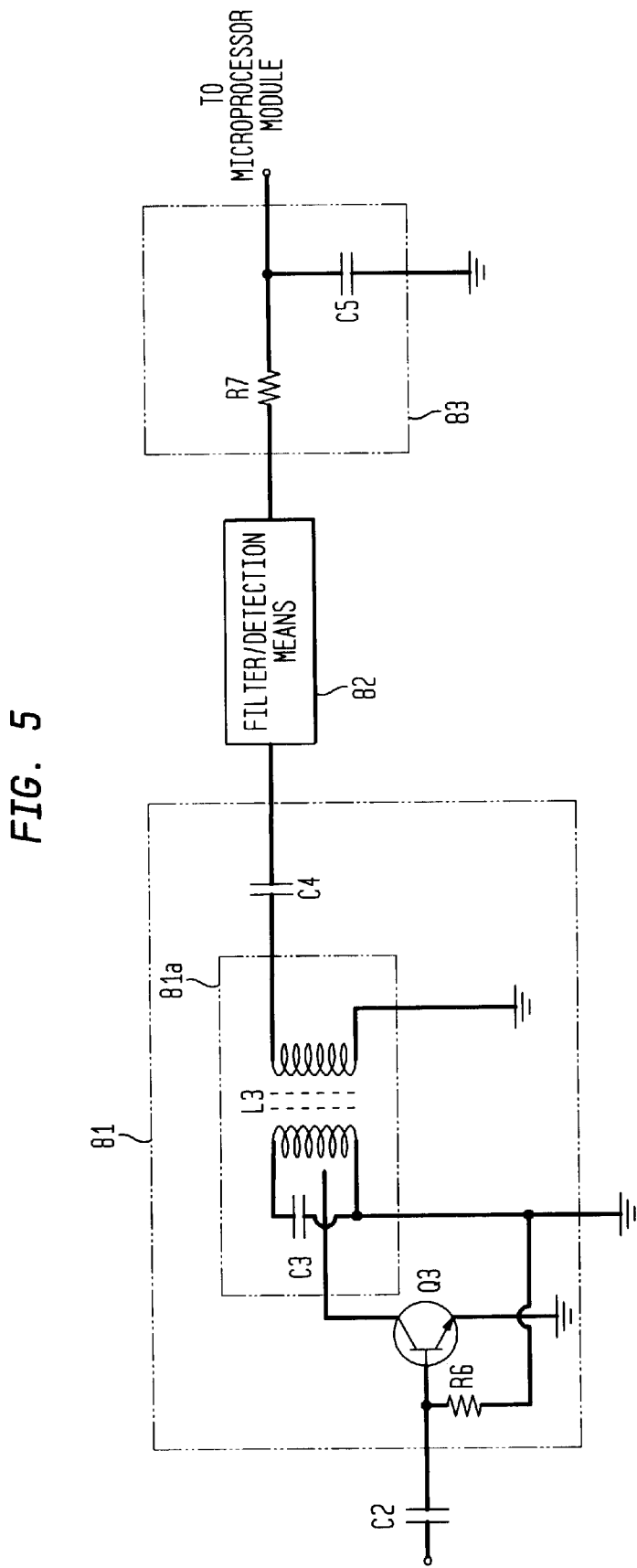
FIG. 5 is a circuit diagram of the RF module of the receiver of this invention.
Figure 6:
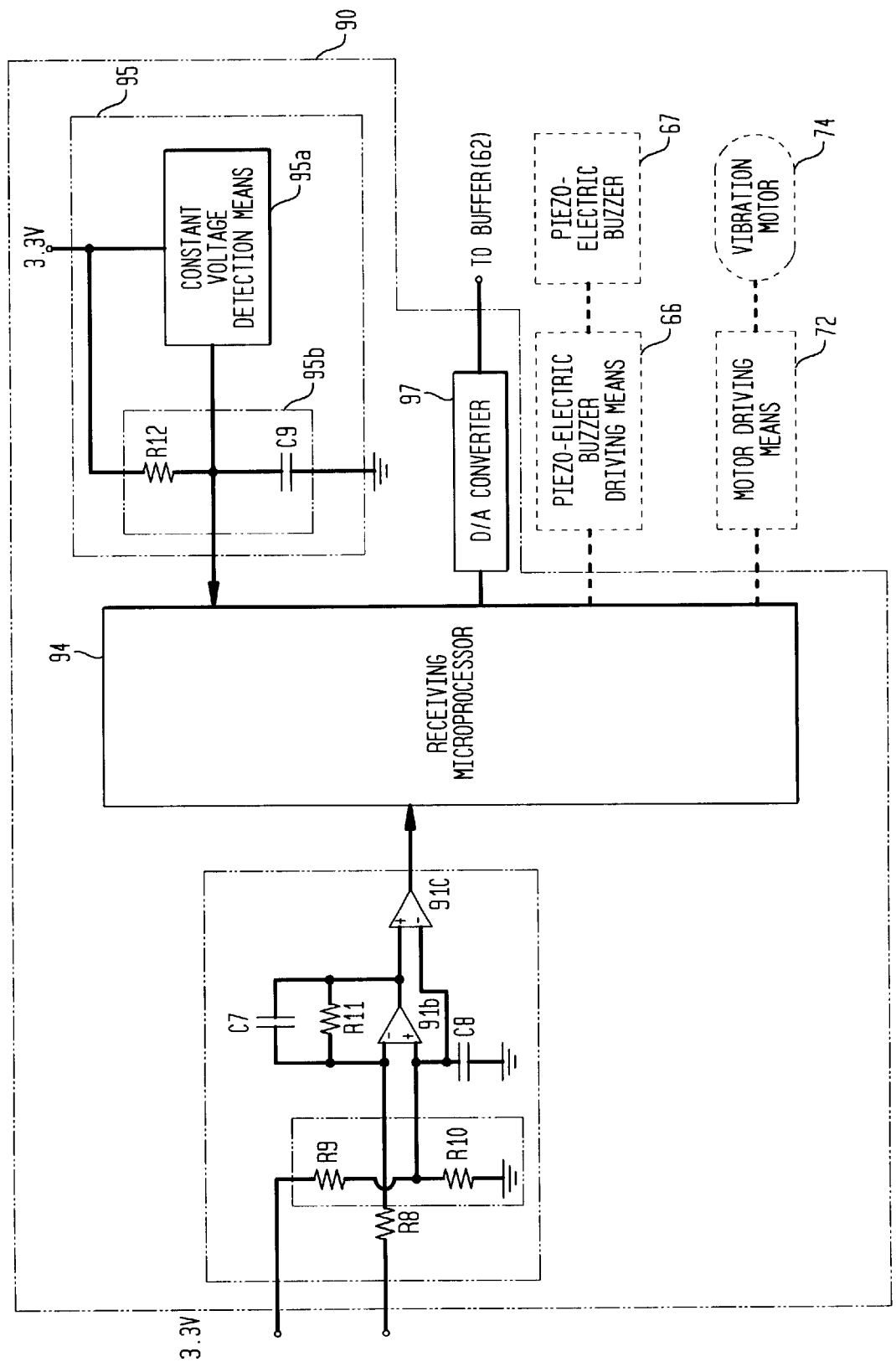
FIG. 6 is a circuit diagram of the microprocessor module of the receiver of this invention.

FIG. 2 is a perspective view showing a transmitter and receiver of the animal training apparatus having a receiving antenna according to the preferred embodiment of this invention, FIG. 3 is a control block diagram of the transmitter of this invention, FIG. 4 is a control block diagram of the receiver of this invention, FIG. 5 is a circuit diagram of the RF module of the receiver of this invention, and FIG. 6 is a circuit diagram of the microprocessor module of the receiver of this invention.

Referring to FIG. 2, the animal training apparatus according to the preferred embodiment comprises a transmitter 10 for transmitting a command from an animal trainer. Referring to FIG. 2 and FIG. 3, the transmitter 10 comprises an electric shock adjusting means 12 and a first through fourth function switches 13, 14, 15 and 16. The electric shock adjusting means 12 sets the intensity level of the electric shock which is applied to the animal by linearly varying the intensity level continuously. The first function switch 13 is adapted to control the electric shock with a level set by the electric shock adjusting means 12 to be outputted for a predetermined period of time. The second function switch 14 is adapted to control an output of vibration, and the third function switch 15 is adapted to control an output of a beep sound for calling the animal. Further, the fourth function switch 16 is adapted to control the electric shock set by the electric shock adjusting means 12 to be outputted instantaneously for a short time.

The transmitter 10 further comprises a transmitting microprocessor 18, an oscillation means 19, a modulation means 20, an RF amplifying means 21, a low pass filter 22, a transmitting antenna 17 and a DC supply voltage switching means 24. The transmitting microprocessor 18 receives operation signals set by the first through fourth function switches 13 through 16, operates and processes the operation signals, selects one among data waveforms of an electric shock generating control signal, a vibration generating control signal, a beep sound generating control signal, and an instantaneous electric shock generating control signals as a control signal data waveform, and outputs the control signal data waveform along with a data waveform of the user's (or trainer's) secret number. The oscillation means 19 oscillates an RF predetermined signal as an oscillation wave. The modulation means 20 modulates a carrier signal of the oscillation wave according to the control signal data waveform selected from the microprocessor 18 and the secret number data waveform. The RF amplifying means 21 RF-amplifies the modulated carrier signal. The low pass filter 22 cuts off the harmonic wave components of the amplified and modulated carrier signal, and outputs a fundamental wave thereof. The transmitting antenna 17 transmits an RF signal of the fundamental wave from the low pass filter 22. The DC supply voltage switching means 24 receives the operation signals set by the first through the fourth switches 13 through 16, and applies a DC supply voltage 23 to the microprocessor 18, the modulation means 20 and the RF amplifying means 21 as an operating voltage in response to the operation signals.

Further, the animal training apparatus of this invention comprises a receiver 50 worn on the neck of an animal for receiving the RF signal from the transmitter 10 and outputting a specific signal to the animal for a predetermined period of time if a trainer's secret number contained in the RF signal corresponds to a pre-stored secret number. Referring to FIG. 2 and FIG. 4, the receiver 50 comprises a receiving antenna 51, a coupling capacitor C2, an RF module 80, a microprocessor module 90, an electric shock driving means 60 and a high voltage generating means 65. The receiving antenna 51 is installed within a case 52 for receiving the RF signal from the transmitting antenna 17 of the transmitter 10. The coupling capacitor C2 cuts off the DC component of the received RF signal and outputs only AC component RF signal. The RF module 80 amplifies the AC component RF signal to a predetermined level, filters and demodulates the amplified signal, and outputs the demodulated signal as an analog signal. The microprocessor module 90 receives the analog signal, converts the analog signal to a digital signal, operates and processes the digital signal, and controls one of the electric shock generating control signal, the vibration generating control signal, the beep sound generating control signal, and the instantaneous electric shock generating control signal, which is applied from any one of the first through fourth function switches 13 through 16, to be outputted if the secret number contained in the received analog signal corresponds to the pre-stored secret number. The electric shock driving means 60 receives the electric shock generating control signal or the instantaneous electric shock generating control signal from the microprocessor module 90, amplifies the electric shock level in response to the electric shock generating control signal to vary the electric shock level linearly by the electric shock adjusting means 12 for a predetermined period of time set by the first function switch 13, or amplifies the electric shock level in response to the instantaneous electric shock generating control signal to instantaneously vary its level linearly for a short period of time set by the fourth function switch 16. Further, the electric shock driving means 60 outputs the amplified signal as an electric shock driving signal or an instantaneous electric shock driving signal. The high voltage generating means 65 receives the electric shock driving signal or the instantaneous electric shock control signal from the electric shock driving means 60, and generates an electric shock with a high voltage having a level varied linearly by the electric shock adjusting means 12.

The receiver 50 further comprises two electrodes 68 and 69, a motor driving means 72 and a buzzer driving means 66. The electrodes 68, 69 are adapted to output the electric shock with the high voltage generated from the high voltage generating means 65 to the animal. The motor driving means 72 receives the vibration generating control signal from the microprocessor module 90, and drives a vibration motor 74 to apply vibration to the animal for a predetermined period of time. The buzzer driving means 66 receives the beep sound generating control signal from the microprocessor module 90 to find the position of the animal, and drives a buzzer 67 to output a beep sound.

Referring to FIG. 4, the electric shock driving means 60 includes a. buffer 62, a Darlington amplifier 64, a stabilizing resistor R1 and feedback resistors R4, R5. The buffer 62 amplifies the electric shock generating control signal from the microprocessor module 90. The Darlington amplifier 64 is switched on by the output of the buffer 62 and amplifies the amplified electric shock generating control signal to a predetermined level. The stabilizing resistor R1 is connected to the emitter of a second transistor Q2 of the Darlington amplifier 64 so as to stabilize an operation of the Darlington amplifier 64. The resistors R4, R5 feed the output signal of the second transistor Q2 back to the buffer 62 in order to stably generate an electric shock by the high voltage generating means 65 regardless of a surrounding temperature.

Referring to FIG. 4, the microprocessor module 90 is connected to an emitting diode D1, which indicates that the electric shock generated in the high voltage generating means 65 is applied to the animal and is grounded through a resistor R3. The emitting diode D1 is installed in the sidewall of the case 52 and represents an output of the electric shock with a high voltage to the animal. Further, a power switch 76 is mounted on the case 52 of the receiver 50 for applying a DC supply voltage 70 to both the RF module 80 and the microprocessor module 90 through a DC switching means 71.

The high voltage generating means 65 includes a transformer T1 having a primary coil L1 of which one end is connected to a supply voltage (Vcc) input terminal and the other end is connected to the collector of the transistor Q1. The means 65 also has a secondary coil L2 for boosting the voltage generated in the coil L1 to the electric shock with a predetermined level and outputting the electric shock through the electrodes 68, 69.

The receiving antenna 51 includes a tuning coil L wound around a ferrite core, and a tuning capacitor C1 connected to the coil L in parallel and used for a receiving resonant frequency.

The electric shock adjusting means 12 employs a variable resistor installed for linearly varying the electric shock generating control signal continuously during an operating (or pushing) time of the first function switch 13.

Referring to the FIG. 4, the input terminal of the buffer 62 is connected to the emitter of the transistor Q2 through feedback resistors R4, R5 to feed back the output signal of the emitter of the transistor Q2 such that the high voltage generating means 65 generates an electric shock stably regardless of a surrounding temperature.

Referring to FIG. 5, the RF module 80 includes a first amplifying means 81, a filter/detection means 82 and an RC filter 83. The first amplifying means 81 cuts off the DC component of the RF signal received from the receiving antenna 51 by the coupling capacitor C2, receives the AC component RF signal, and amplifies the AC component RF signal to a predetermined level, in addition, tunes a receiving frequency exactly and outputs only AC component signal of the tuned result. The filter/detection means 82 filters off a noise component of the AC component signal amplified by the first amplifying means 81, detects the filtered signal, and outputs the detected signal. The RC filer 83 having a resistor R7 and a capacitor C5, filters off a noise component of the detected signal from the filter/detection means 82 and outputs the noise-filtered detection signal to the microprocessor module 90.

The amplifying means 81 includes a transistor Q3, a tank circuit 81a and a coupling capacitor C4. The transistor Q3 cuts off the DC component of the RF signal received from the receiving antenna 51 by the coupling capacitor C2, receives the AC component signal, and amplifies the AC component signal to the predetermined level. The tank circuit 81a has a capacitor C3 in addition to a coil L3 wound around the ferrite core and receives the amplified signal from the transistor Q3, and tunes the receiving frequency exactly. The coupling capacitor C4 cuts off a DC component of the output signal from the tank circuit 81a, and outputs the AC component signal to the filter/detection means 82.

Referring to FIG. 6, the microprocessor module 90 includes a second amplifying means 91, a receiving microprocessor 94, a D/A converter 97, and an error operation protection circuit 95. The second amplifying means 91 receives the noise-filtered detection signal from the RC filter 83 of the RF module 80, and amplifies the noise-filtered detection signal to a predetermined level. The receiving microprocessor 94 receives the amplified signal from the second amplifying means 91, determines whether or not the secret number contained in the amplified signal. corresponds to the pre-inputted secret number, and outputs one of the electric shock generating control signal, the vibration generating control signal, the beep sound generating control signal, and an instantaneous electric shock generating control signal as a digital signal if they are the same. The D/A converter 96 receives a digital electric shock generating control signal from the receiving microprocessor 94, converts the digital electric shock generating control signal to the analog signal, and outputs the analog signal to the buffer 62. The error operation protection circuit 95 detects an operating voltage of the microprocessor 94, and stops the operation of the microprocessor 94 for a predefined period of time if the detected operating voltage is lower than a predetermined voltage level.

The error operation protection circuit 95 includes a constant voltage detecting means 95a and a time constant circuit 95b. The constant voltage detecting means 95a detects the operating voltage applied to the microprocessor 94. The time constant circuit 95b stops the operation of the microprocessor 94 for the predefined period of time if the operating voltage is lower than the predetermined voltage level.

The second amplifying means 91 includes a first amplifier 91b, a second amplifier 91c, and a capacitor C8. The first amplifier 91b receives the noise-filtered detection signal from the RC filter 83 of the RF module 80 through a resistor R8 at the inverting terminal(-), and a reference voltage set by the reference voltage setting circuit 91a having resistors R9, R10 at the non-inverting terminal(+), and amplifies the input signals from the inverting and non-inverting terminals to the amplification degree determined by the resistors R8, R10 and a capacitor C7. The second amplifier 91c amplifies the signal amplified by the first amplifier 91b again and outputs the amplified signal to the microprocessor 94. The capacitor C8 is adapted to bypass the AC component of the reference voltage to the ground in order to apply the DC reference voltage to the first and second amplifiers 91b, 91c. The time constant circuit 95b includes a resistor R12 and a capacitor C9.

Hereinafter, an operational effect of the present invention having the construction above is described in detail.

First, an intensity data indicating the electric shock level is applied to the transmitting microprocessor 19. At this time, if the first function switch 13 has been pushed (operated), the operation signal set by the first function switch 13 is applied to the transmitting microprocessor 18.

The microprocessor 18 operates and processes the operation signal from the first function switch 13 and outputs a data waveform of the trainer's secret number with the waveform of the electric shock generating control signal to the modulating means 20, in addition, the oscillation control signal to the oscillation means 19.

Further, the modulating means 20 combines the electric shock generating control signal with the signal oscillated in the oscillation means 19 for a predetermined period of time (typically, n seconds), and then modulates the combined signal to a carrier signal. Then, the carrier signal from the modulating means 20 is amplified in the RF amplifying means 21 to the RF signal. Then, the low pass filter 22 cuts off the high frequency component (or harmonic wave components) of the RF signal and transmits the lower frequency component (or fundamental wave) of the RF signal to the receiving antenna 51 installed within the case 52 of the receiver 50 through the transmitting antenna 17. Thereby, the trainer's command can be transmitted along with the secret number to the receiver 50 through the antenna 17.

Here, the operation signal of the first function switch 13 is also applied to the DC supply voltage switching means 24, thus, allowing the DC supply voltage 23 to be supplied to the transmitting microprocessor 18, the modulating means 20 and the RF amplifying means 21 as an operating voltage.

As described above, the RF signal (specifically, the secret number data waveform and the electric shock generating control signal data waveform) is received to the receiving antenna 51 within the case 52 of the receiver 50. The coupling capacitor C2 cuts off the DC component of the RF signal and passes the AC component RF signal to the RF module 80.

The RF module 80 amplifies the AC component RF signal from the coupling capacitor C2 to a predetermined level, filters and detects the amplified signal, and outputs the detected signal to the microprocessor module 90. Then, the microprocessor module 90 outputs the electric shock generating control signal, received by the first function switch 13, to the buffer 62. The buffer 62 amplifies the electric shock generating control signal to a predetermined level and outputs the amplified signal to the base of a first transistor Q1. Therefore, the first and second transistors Q1 and Q2 of the Darlington amplifier 64 are switched on, and the Darlington amplifier 64 amplifies the electric shock generating control signal to a predetermined level. At this time, a current flows in a primary coil L1 of the transformer T1 and the voltage proportional to the current is generated at the secondary coil L2. Thereby, the electric shock is outputted from the electrodes 68, 69 of the transformer T1, and is applied to the neck of the animal to train it.

Referring to FIG. 4, a resistor R1 is connected to the emitter of the second transistor Q2, thus allowing the Darlington amplifier 64 to operate stably when the electrodes 68,69 output electric shocks.

The feedback resistors R4, R5 are connected to the input of the buffer 62 in order to feed the output signal of the emitter of the transistor Q2 back to the input of the buffer 62. In this regard, the electric shock may be generated from the electrodes 68, 69 of the high voltage generating means 65 stably regardless of the surrounding temperature. Further, the diode D1 emits light to indicate that the electric shocks with the high voltage are outputted from the electrodes 68, 69.

Hereafter, the operations of the RF module 80 and the microprocessor module 90 will be described in detail. Referring to FIG. 5, a third transistor Q3 of the first amplifying means 81 in the RF module 80 receives an AC component electric shock generating control signal through the coupling capacitor C2 and amplifies the received signal to a predetermined level. A tank circuit 81a, having both a capacitor c3 and a coil L3 wound around a ferrite core, tunes the received signal to an exact frequency, and the coupling capacitor C4 cuts off the DC component of the tuned signal and outputs an AC component signal to the filter/detection means 82.

The filter/detection means 82 filters off a noise component of the Ac component signal from the first amplifying means 81 and detects the filtered signal. The RC filter 83 filters off a noise component of the detected signal, and outputs the noise-filtered detection signal to the microprocessor module 90.

Referring to FIG. 6, in the second amplifying means 91 of the microprocessor module 90, the noise-filtered detection signal from the RC filter 83 of the RF module 80 is inputted to the inverting terminal(−) of the first amplifier 91b through the resistor R8 and a reference voltage set by the reference voltage setting circuit 91a having resistors R9, R10 is inputted to the non-inverting terminal(+). The first amplifier 91b amplifies the input signals to an amplification degree determined by the resistors R8, R11 and the capacitor C7. The amplifier 91c amplifies the amplified signal again and outputs the amplified signal to the receiving microprocessor 94.

The receiving microprocessor 94 receives the signal amplified by the second amplifying means 91, compares it to the preset (pre-stored) secret number within the microprocessor 94 and if it corresponds to the pre-stored secret number, outputs the electric shock generating control signal to the D/A converter 97 such that the electric shock is outputted from the electrodes 68,69 of the high voltage generating means 65.

An operation of outputting the instantaneous electric shock from the electrodes 68, 69 of the high voltage generating means 65 by operating the fourth function switch 16 is similar to that of the electric shock by the first function switch 13, but different in that the electric shock with the level set by the electric shock adjusting means 12 is outputted instantaneously for a short period of time even if the first function switch 13 is pushed for a long time. Therefore, for simplicity of description, the operation of outputting the instantaneous electric shock is omitted.

Hereinafter, the operation of outputting the vibration wave is described as follows. When the second function switch 14 is pushed, the operation signal set in the second function switch 14 is applied to the transmitting microprocessor 18. In this case, the microprocessor 18 operates and processes the operation signal, and outputs the trainer's secret number data waveform with a preset control signal of the vibration data waveform to the modulation means 20, in addition, the oscillation control signal to the oscillation means 19.

The modulation means 20 combines the generating control signal of the vibration data from the microprocessor 18 with the oscillation signal oscillated for a predetermined period of time (typically, n seconds) by the oscillation means 19 and modulates the signals to a carrier signal. The RF amplifying means 21 RF-amplifies the carrier signal from the modulating means 20 to the RF signal. The low pass filter 22 cuts off the high frequency component of the RF signal and transmits the low frequency component signal to the receiving antenna 51 installed within the case 52 of the receiver 50 through the transmitting antenna 17. Thus, the transmitter 10 transmits a vibration control command generated as the trainer pushes the second function switch 14 along with the trainer's secret number data to the receiver 50 through the transmitting antenna 17.

In this case, the operation signal of the second function switch 14 is applied to the DC supply voltage switching means 24. Thus, the DC supply voltage switching means 24 operates to apply the DC supply voltage 23 to the microprocessor 18, the modulation means 20, and the RF amplifying means 21 as an operating voltage.

As described above, referring to FIG. 4, the RF signal (specifically, the trainer's secret number data waveform and vibration data waveform) is received at the receiving antenna 51 installed within the case 52 of the receiver 50. The coupling capacitor C2 cuts off the DC component of the RF signal and outputs the AC component RF signal to the RF module 80.

The RF module 80 amplifies the AC component RF signal to the predetermined level, filters and detects the amplified signal, and outputs the detected signal to the microprocessor module 90. Referring to FIG. 6, the microprocessor module 90 receives the noise-filtered detection signal from the RC filter 83 of the RE module 80 through the resistor R8 of the second amplifying means 91 at the inverting terminal(−) of the first amplifier 91b. In addition, the microprocessor module 90 receives the reference voltage set by the reference voltage setting circuit 91a at the non-inverting terminal (+) of the first amplifier 91b. The first amplifier 91b amplifies the input signals to an amplification degree determined by the resistors R8, R1 and the capacitor C7. The second amplifier 91c amplifies the signal amplified by the first amplifier 91b again and applies the amplified signal to the receiving microprocessor 94.

The microprocessor 94 receives the amplified signal from the second amplifying means 91, compares a trainer's secret number contained in the amplified signal to the secret number pre-stored therein. If they are the same, the microprocessor 94 applies the vibration generating control signal from the second function switch 14 to the vibration motor driving means 72, and the vibration motor 74 is driven according to the vibration generating control signal, such that the vibration is applied to the animal.

On the other hand, if the trainer pushes the third function switch 15 to find the position of the animal, the operation signal of the third function switch 15 is applied to the microprocessor 18. At this time, the microprocessor 18 operates and processes the operation signal, and outputs the trainer's secret number data waveform with a preset beep sound data waveform to the modulation means 20, and the oscillation control signal to the oscillation means 19.

The modulation means 20 combines the beep sound generating control signal from the microprocessor 18 with the oscillation signal oscillated by the oscillation means 19 for a predetermined period of time (typically, in seconds) and modulates the combined signal to a carrier signal. The RF amplifying means 21 RF-amplifies the carrier signal from the modulating means 20 to the RF signal. The low pass filter 22 cuts off the high frequency component of the RF signal and transmits the low frequency component signal to the receiving antenna 51 installed within the case 52 of the receiver 50 through the transmitting antenna 17. Thus, the transmitter 10 transmits the trainer's command signal (beep sound output command signal) along with the trainer's secret number data to the receiver 50 through the transmitting antenna 17.

In this case, the operation signal of the third function switch 15 is applied to the DC supply voltage switching means 24, thus, allowing the DC supply voltage switching means 24 to apply the DC supply voltage 23 to the microprocessor 18, the modulation means 20, and the RF amplifying means 21 as an operating voltage.

As described above, the RF signal for beep sound control (specifically, the trainer's secret number and beep sound data waveform) is transmitted to the receiver 50 through the transmitting antenna 17. Referring to FIG. 4, the receiving antenna 51 installed within the case 52 of the receiver 50 receives the RF signal. The coupling capacitor C2 cuts off the DC component of the RF signal and outputs the AC component RF signal to the RF module 80.

The RF module 80 amplifies the AC component RF signal to a predetermined level, filters and detects the amplified signal, and outputs the detected signal to the microprocessor module 90. The microprocessor module 90 receives the noise-filtered detection signal from the RC filter 83 through the resistor R8 of the second amplifying means 91 at the inverting terminal(−) of the first amplifier 91b. In addition, the microprocessor module 90 receives the reference voltage set by the reference voltage setting circuit 91a at the non-inverting terminal(+) of the first amplifier 91b. The first amplifier 91b amplifies the input signals to the amplification degree determined by the resistors R8, R1 and the capacitor C7. The second amplifier 91c amplifies the signal amplified by the first amplifier 91b again and applies the amplified signal to the receiving microprocessor 94.

The microprocessor 94 receives the amplified signal from the second amplifying means 91, compares the trainer's secret number contained in the amplified signal to the pre-stored secret number therein. If they are the same, the microprocessor 94 applies the beep sound generating control signal from the third function switch 15 to the buzzer driving circuit 66, such that the buzzer 67 is activated to output the beep sound according to the beep sound generating control signal and thereby, the position of the animal can be found.

Here, the operations of outputting the vibration and beep sound are the same as that described for the operations of outputting the electric shock and the instantaneous electric shock. Accordingly, for simplicity of description, the repeated description is omitted.

Hereinafter, the method of controlling the animal training apparatus having the configuration above according to the present invention is described in detail.

FIG. 7 is a flowchart showing the controlling method of the animal training apparatus of this invention. Referring to FIG. 7, "S" represents a step of the controlling process.

First, when the intensity level of the electric shock is set by the electric shock adjusting means 12 at step S1, the data containing the intensity level of the electric shock is applied to the transmitting microprocessor 18. In this case, it is determined whether or not the electric shock is outputted from the electrodes 68, 69 of the high voltage generating means 65 at step S2. Then, if it is determined that the electric shock is outputted, it is determined whether or not the animal follows a command from a trainer at step S3. If the animal doesn't follow the trainer's command, the electric shock is outputted from the electrodes. 68, 69 of a high voltage generating means 65 during an operating time of the first function switch 13, while increasing the output level of the electric shock linearly by the electric shock adjusting means 12 at step S4. On the other hand, if the animal follows the trainer's command, the electric shock is outputted from the electrodes 68, 69 of the high voltage generating means 65 during an operating time of the first function switch 13, while decreasing the output level of the electric shock linearly by the electric shock adjusting means 12 at step S5.

In other words, if the animal doesn't follow the trainer's command, the trainer tunes the electric shock adjusting means 12 to an increasing direction during a pushing time of the first function switch 13 such that the electric shock outputted from the electrodes 68, 69 of the high voltage generating means 65 is applied to the animal while increasing the level of the electric shock. Otherwise, if the animal follows the trainer's command, the trainer tunes the electric shock adjusting means 12 to a decreasing direction during a pushing time of the first function switch 13 such that the electric shock outputted from the electrodes 68, 69 is applied to the animal while decreasing the level of the electric shock. As described above, the present invention can be used to train the animal easily.

On the other hand, if the electric shock is not outputted at step S2, it is determined whether or not vibration is outputted at step S6. If vibration is outputted, the vibration is outputted to the animal by driving a vibration motor 74 during an operating time of a second function switch 14 at step S7. However, if the vibration is not outputted, it is determined whether or not a beep sound is outputted at step S8. If a beep sound is outputted, the beep sound is outputted through the buzzer 67 in order to find a position of the animal during an operating time of a third function switch 15 at step S9. If no beep sound is outputted, it is determined whether or not the instantaneous electric shock is outputted at step S10. If the instantaneous electric shock is outputted, the instantaneous electric shock is outputted through the electrodes 68, 69 only for a time preset by the microprocessor module 90 during an operating time of a fourth function switch 16 at step S11. If any instantaneous electric shock is not outputted at step S10, the processing step is returned to step S1 and the steps of S1 through S11 are performed repeatedly.

As apparent from the above description, the present invention provides an animal training apparatus and method of controlling the apparatus. The transmitter of the apparatus varies or sets the intensity level of the electric shock linearly by an electric shock adjusting means, operates any one selected from the first through fourth function switches, and outputs a control signal corresponding to a selected switch from the antenna of the transmitter to a receiver worn on the neck of an animal, and the receiver receives the signal from the transmitter, outputs the electric shock to the animal while varying the electric shock linearly by the electric shock adjusting means for a predetermined period of time when the trainer operates the first function switch.

Further, the present invention provides an animal training apparatus and method thereof, which can output an instantaneous electric shock with a high voltage instantaneously if the trainer pushes the fourth function switch, vibration by the second function switch, and the beep sound by the third switch, thus, allowing the trainer to train the animal with ease and to find a position of the animal without difficulty.

Further, the present invention is advantageous in that it can prevent a catch of obstacles such as grass or a bush at the gap between a collar and an antenna in order for an animal to move without hindrance when the animal is quickly moving for a target, because the receiving antenna is installed inside the case of the receiver. Further, the present invention is also advantageous in that it can receive an electric signal with high sensitivity from the transmitter even when it rains or the animal goes in water without care about leakage of the received signal.

Further, the present invention is also advantageous in that it can minimize a stress applied to the animal by applying the electric shock with a high voltage to the animal only for a predetermined period of time while varying the electric shock linearly by adjusting the electric shock adjusting means to train the animal.

Further, the present invention is also advantageous in that a plurality of electrical parts, used for receiving an AC component signal of the electric shock generating control signal, vibration generating control signal, beep sound generating control signal, and instantaneous electric shock generating control signal received from the receiving antenna, and amplifying the signals to a predetermined level in addition to filtering and detecting the signals are made in the form of RF module. In addition, a signal processing part, used for receiving signals from the RF signal, operating and processing the signals, controlling of outputting one of the electric shock generating control signal, vibration generating control signal, beep sound generating control signal, and instantaneous electric shock generating control signal applied from a selected one of the first through fourth function switches if a secret number corresponds the pre-stored secret number, is made in the form of microprocessor module. It is thus possible to simplify the construction of the apparatus, reduce the manufacturing cost, utilize the apparatus without difficulty, and guarantee an easy maintenance by only replacing some broken modules with new ones as desired.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An animal training apparatus comprising a transmitter (10) for transmitting a command from an animal trainer and a receiver (50) worn on the neck of an animal for receiving an RF signal from the transmitter (10) and outputting a specific signal to the animal for a predetermined period of time if a trainer's secret number contained in the RF signal corresponds to the pre-stored secret number, wherein the transmitter (10) comprises:
an electric shock adjusting means (12) for setting the intensity level of an electric shock applied to the animal by linearly varying the level continuously;
a first function switch (13) for controlling the electric shock with the level set by the electric shock adjusting means 12 to be outputted for a predetermined period of time;
a second function switch (14) for controlling an output of vibration;
a third function switch (15) for controlling an output of a beep sound for calling the animal;
a fourth function switch (16) for controlling the electric shock set by the electric shock adjusting means (12) to be outputted instantaneously for a short time;
a transmitting microprocessor (18) for processing operation signals set by the first through fourth switches (13) through (16), selecting one among data waveforms of an electric shock generating control signal, a vibration generating control signal, a beep sound generating control signal, and an instantaneous electric shock generating control signal as a control signal data waveform, and outputting the control signal data waveform along with a data waveform of the user's secret number;
an oscillation means (19) for oscillating an RF predetermined signal as an oscillation wave;
a modulation means (20) for modulating a carrier signal of the oscillation wave according to the control signal data waveform selected from the microprocessor (18) and the secret number data waveform;
an RF amplifying means (21) for RF-amplifying the modulated carrier signal;
a low pass filter (22) for cutting off harmonic wave components of the amplified and modulated carrier signal, and outputting a fundamental wave thereof; and
a transmitting antenna (17) for transmitting an RF signal of the fundamental wave from the low pass filter (22); and the receiver (50) comprises:
a receiving antenna (51) installed within a case (52) for receiving the RF signal from the transmitting antenna (17) of the transmitter (10);

a coupling capacitor (C2) for cutting off a DC component of the RF signal, and outputting only an AC component RF signal;

an RF module (80) for amplifying the AC component RF signal to a predetermined level, filtering the amplified result, demodulating the filtered signal, and outputting the demodulated signal as an analog signal;

a microprocessor module (90) for converting the analog signal to a digital signal, processing the digital signal, and controlling one of the electric shock generating control signal, the vibration generating control signal, the beep sound generating control signal, and an instantaneous electric shock generating control signal, which is previously applied from any one of the first through fourth function switches (13) through (16) to be outputted if a secret number contained in the received analog signal corresponds to a pre-stored secret number;

an electric shock driving means (60) for receiving the electric shock generating control signal or the instantaneous electric shock generating control signal from the microprocessor module (90), amplifying the electric shock level in response to the electric shock generating control signal to vary the electric shock level linearly by the electric shock adjusting means (12) for a predetermined period of time set by the first function switch (13), or amplifying the electric shock level in response to the instantaneous electric shock generating control signal to instantaneously vary its level linearly for a short period of time set by the fourth function switch (16) and outputting the amplified signal as an electric shock driving signal or an instantaneous electric shock driving signal;

a high voltage generating means (65) for generating an electric shock with a high voltage having a level varied linearly by the electric shock adjusting means (12) in response to the electric shock driving signal or the instantaneous electric shock driving signal from the electric shock driving means (60);

a plurality of electrodes (68, 69) for outputting the electric shock with the high voltage generated from the high voltage generating means (65) to the animal;

a motor driving means (72) for driving a vibration motor (74) in response to the vibration generating control signal from the microprocessor module (90) and applying vibration to the animal for a predetermined period of time; and a buzzer driving means (66) for driving a buzzer (67) to output a beep sound in response to the beep sound generating control signal from the microprocessor module (90), thus finding a position of the animal.

2. The apparatus as set forth in claim 1, wherein the electric shock driving means (60) includes a buffer (62) for amplifying the electric shock control signal from the microprocessor module (90), a Darlington amplifier (64) switched on by the output of the buffer (62) for amplifying the amplified electric shock control signal to a predetermined level, a stabilizing resistor (R1) connected to an emitter of a second transistor (Q2) of the Darlington amplifier (64) so as to stabilize an operation of the Darlington amplifier (64), and a plurality of feed back resistors (R4, R5) for feeding the output signal of the second transistor (Q2) back to the buffer (62) in order to generate the electric shock stably by the high voltage generating means (65) regardless of a surrounding temperature.

3. The apparatus as set forth in claim 1, wherein the microprocessor module (90) is connected to an emitting diode (D1), which indicates that the electric shock generated in the high voltage generating means (65) is applied to the animal and is grounded through a resistor (R3).

4. The apparatus as set forth in claim 1, wherein the receiving antenna (51) includes a tuning coil (L) wound around a ferrite core and a tuning capacitor (C1) connected to the coil (L) in parallel and setting a receiving resonant frequency.

5. The apparatus as set forth in claim 1, wherein the RF module (80) includes a first amplifying means (81) for cutting off a DC component of the RF signal received from the receiving antenna (51) by the coupling capacitor (C2), receiving an AC component RF signal, and amplifying the AC component RF signal to a predetermined level, in addition, tuning a receiving frequency exactly, and outputting only an AC component signal from the tuned result, a filter/detection means (82) for filtering off a noise component of the AC component signal amplified by the first amplifying means (81), detecting the filtered signal, and outputting the detected signal, an RC filer (83) having a resistor (R7) and a capacitor (C5) for filtering off a noise component of the detected signal from the filter/detection means (82), and outputting a noise-filtered detection signal to the microprocessor module (90).

6. The apparatus as set forth in claim 5, wherein the amplifying means (81) includes a transistor (Q3) for cutting off the DC component of the RF signal received from the receiving antenna (51) by the coupling capacitor (C2), receiving the AC component RF signal, and amplifying the AC component RF signal to the predetermined level, a tank circuit (81a) having a capacitor (C3) and a coil (L3) wound around the ferrite core for receiving the amplified signal by the transistor (Q3) and tuning the receiving frequency exactly, and a coupling capacitor (C4) for cutting off a DC component of the output signal from the tank circuit (81a) and outputting an AC component signal to the filter/detection means (82).

7. The apparatus as set forth in claim 1, wherein the microprocessor module (90) includes a second amplifying means (91) for receiving a noise-filtered detection signal from an RC filter (83) of the RF module (80), and amplifying the noise-filtered detection signal to a predetermined level, a receiving microprocessor (94) for receiving the amplified signal from the second amplifying means (91), determining whether or not a trainer's secret number contained in the amplified signal corresponds to the pre-inputted secret number, and outputting one of the electric shock generating control signal, the vibration generating control signal, the beep sound generating control signal, and an instantaneous electric shock generating control signal as a digital signal if they are the same, a D/A converter (97) for receiving a digital electric shock generating control signal from the receiving microprocessor (94), converting the digital electric shock control signal to the analog signal, and outputting the analog signal to the buffer (62), and an error operation protection circuit (95) for detecting an operating voltage of the microprocessor (94), and stopping the operation of the microprocessor (94) for a predetermined period of time if the operating voltage is lower than a predetermined voltage level.

8. The apparatus as set forth in claim 7, wherein the error operation protection circuit (95) includes a constant voltage detecting means (95*a*) for detecting the operating voltage applied to the microprocessor (94), and a time constant circuit (95*b*) for stopping the operation of the microprocessor (94) for the predefined period of time if the operating voltage is lower than the predetermined voltage level.

9. The apparatus as set forth in claim 1, wherein the electric shock adjusting means (12) is a variable resistor installed for linearly varying the level of the electric shock generating control signal continuously during an operating time of the first function switch (13).

10. The apparatus as set for the in claim 1, wherein the vibration motor (74) uses a pivot motor.

11. A method of controlling an animal training apparatus having a receiving antenna, comprising the steps of:

a) setting an intensity level of an electric shock by an electric shock adjusting means (12);

b) determining whether or not the electric shock is outputted;

c) determining whether or not the animal follows a command from a trainer if the electric shock is outputted;

d) outputting the electric shock from a plurality of electrodes (68, 69) of a high voltage generating means (65) during an operating time of a first function switch (13), while increasing the output level of the electric shock linearly by the electric shock adjusting means (12) if the animal doesn't follow the command at step c);

e) outputting the electric shock from the electrodes (68, 69) of the high voltage generating means (65) during an operating time of the first function switch (13), while decreasing the output level of the electric shock linearly by the electric shock adjusting means (12) if the animal follows the command at step c);

f) determining whether or not vibration is outputted if the electric shock is not outputted at step c);

g) outputting vibration to the animal by driving a vibration motor (74) during an operating time of a second function switch (14) if vibration is outputted at step f);

h) determining whether or not a beep sound is outputted, if vibration is not outputted at step f);

i) outputting the beep sound through a buzzer (67) in order to find a position of the animal during an operating time of a third function switch (15) if the beep sound is outputted at step h);

j) determining whether or not an instantaneous electric shock is outputted if the beep sound is not outputted at step h);

k) outputting the instantaneous electric shock from the electrodes (68, 69) during an operating time of a fourth switch (16) if the instantaneous electric shock is outputted at step h); and l) returning to step a) if the instantaneous electric shock is not outputted at step j).

* * * * *